United States Patent
Song et al.

(10) Patent No.: US 11,461,323 B2
(45) Date of Patent: Oct. 4, 2022

(54) TECHNIQUES FOR EFFICIENT QUERY PROCESSING

(71) Applicant: Visa International Service Association, San Francisco, CA (US)

(72) Inventors: Hongqin Song, Austin, TX (US); Yu Gu, Austin, TX (US); Shizhuo Yu, Foster City, CA (US); Raghunandan Surapaneni, Cedar Park, TX (US); Shawn Johnson, Foster City, CA (US); Kalpana Jogi, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 53 days.

(21) Appl. No.: 16/457,466

(22) Filed: Jun. 28, 2019

(65) Prior Publication Data

US 2020/0409953 A1  Dec. 31, 2020

(51) Int. Cl.
*G06F 16/24* (2019.01)
*G06F 16/2453* (2019.01)

(52) U.S. Cl.
CPC .............................. *G06F 16/24542* (2019.01)

(58) Field of Classification Search
CPC .. G06F 16/58; G06F 16/583; G06F 16/24578; G06F 16/438; G06F 16/9038; G06F 16/334; G06F 16/538; G06F 16/24; G06F 16/2425; G06F 16/90335; G06F 3/0486
See application file for complete search history.

(56) References Cited

U.S. PATENT DOCUMENTS

| 8,312,037 | B1* | 11/2012 | Bacthavachalu | G06N 5/02 707/769 |
|---|---|---|---|---|
| 2004/0024784 | A1* | 2/2004 | Spall | G06Q 30/02 |
| 2006/0004807 | A1* | 1/2006 | Cruanes | G06F 16/252 |
| 2008/0162409 | A1* | 7/2008 | Meijer | G06F 16/283 |
| 2009/0276404 | A1* | 11/2009 | Henigman | G06F 16/00 |
| 2011/0225144 | A1* | 9/2011 | Josifovski | G06F 16/24524 707/713 |
| 2012/0166486 | A1* | 6/2012 | Visser | G06F 40/18 707/792 |
| 2013/0117310 | A1* | 5/2013 | Chai | G06F 16/972 |
| 2013/0226966 | A1* | 8/2013 | Shmueli | G06F 16/2471 707/770 |

(Continued)

*Primary Examiner* — Augustine K. Obisesan
(74) *Attorney, Agent, or Firm* — Kilpatrick Townsend & Stockton LLP

(57) ABSTRACT

Described herein are a system and techniques for increasing the efficiency of generating a result set for a query. In some embodiments, the techniques may involve performing computations on a high-level element, sorting, and selecting a set of the high-level elements, and recursively repeating the process on sub-elements of the set of the high-level elements. The process may be recursively repeated until a specified level of granularity is reached. This may significantly decrease the number of computations that need to be performed, increasing the speed with which queries can be performed. In some embodiments, the process may involve identifying elements which may be highly correlated to optimal computation results and may add those elements to the result set to improve the accuracy of the result set.

17 Claims, 6 Drawing Sheets

(56) References Cited

U.S. PATENT DOCUMENTS

| | | | |
|---|---|---|---|
| 2014/0181084 A1* | 6/2014 | Herron | G06F 16/2455 707/722 |
| 2015/0032725 A1* | 1/2015 | Barykin | G06F 16/2465 707/722 |
| 2015/0370856 A1* | 12/2015 | Johnson | G06F 16/282 707/736 |
| 2017/0371924 A1* | 12/2017 | Ding | G06F 16/2453 |

* cited by examiner

TECHNIQUES FOR EFFICIENT QUERY PROCESSING

BACKGROUND

When performing queries on large data sets, a system needs to perform a large number of computations for each query. Even in the case that each computation individually takes mere milliseconds to complete, the query itself may take several minutes to complete if the computations are being performed on a large number of elements, which can be unacceptable when a result set is required in a short amount of time.

Embodiments of the disclosure address these and other problems, individually and collectively.

SUMMARY

Described herein are a system and techniques for increasing the efficiency of generating a result set for a query. In some embodiments, the techniques may involve performing computations on a high-level element, sorting, and selecting a set of the high-level elements, and recursively repeating the process on sub-elements of the set of the high-level elements. The process may be recursively repeated until a specified level of granularity is reached. This may significantly decrease the number of computations that need to be performed, increasing the speed with which queries can be performed. In some embodiments, the process may involve identifying elements which may be highly correlated to optimal computation results and may add those elements to the result set to improve the accuracy of the result set.

One embodiment of the disclosure is directed to a method comprising maintaining, by a service provider, a set of elements and sub-elements, wherein each element comprises multiple sub-elements and wherein aggregate data values are stored for each of the elements and sub-elements, receiving a query indicating computations to be performed on one or more sub-elements, obtaining a first result set by performing the computations on aggregate data values for each of the elements in the set of elements, selecting a subset of the set of elements based on the first result set in accordance with the query, obtaining a second result set by performing the computations on data values for each of the sub-elements comprising the elements in the subset, and performing further processing with respect to at least a portion of the second result set.

Yet another embodiment of the disclosure is directed to a service provider comprising a processor; and a memory including instructions that, when executed with the processor, cause the service provider to, at least: maintain a set of elements and sub-elements, wherein each element comprises multiple sub-elements and wherein aggregate data values are stored for each of the elements and sub-elements, receive a query indicating computations to be performed on one or more sub-elements, obtain a first result set by performing the computations on aggregate data values for each of the elements in the set of elements, select a subset of the set of elements based on the first result set in accordance with the query, obtain a second result set by performing the computations on data values for each of the sub-elements comprising the elements in the subset, and performing further processing with respect to at least a portion of the second result set.

Yet another embodiment of the disclosure is directed to a client device comprising: a processor; and a memory including instructions that, when executed with the processor, cause the client device to, at least: receive, from a user of the client device, a query requesting a result set, determine, based on the query, one or more sub-elements associated with the query, provide, to a service provider, the query including an indication of the one or more sub-elements, the service provider being caused to: obtain a first result set by performing one or more computations on aggregate data values stored in relation to a number of elements which are composed of the one or more sub-elements, and obtain a second result set by selecting a subset of the number of elements based on the first result set and performing the one or more computations on aggregate data values stored in relation to the one or more sub-elements which compose the elements in the number of elements, receive, from the service provider, a response to the query that includes at least a portion of the second result set, and perform additional processing with respect to the portion of the second result set.

These and other embodiments of the disclosure are described in further detail below.

DETAILED DESCRIPTION

Figure 1:
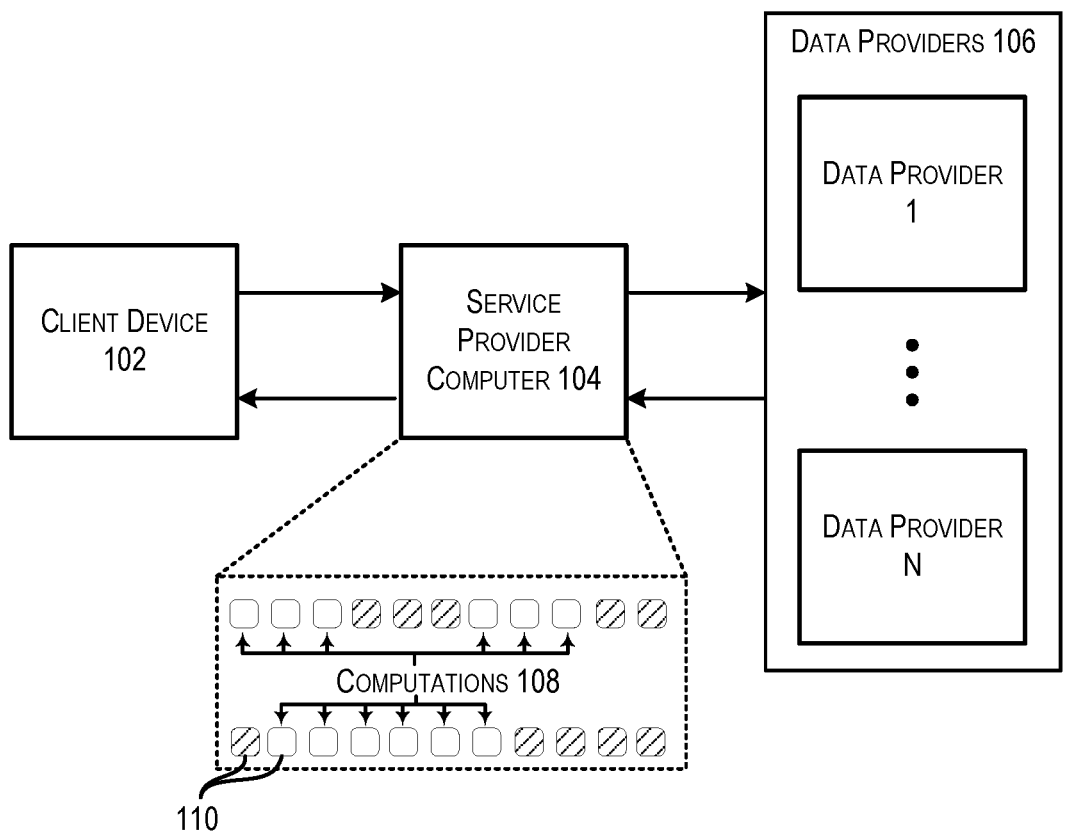
FIG. 1 depicts a number of components that may be involved in a system used to implement at least some embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present disclosure, description of some terms may be helpful in understanding the various embodiments.

An "aggregate data value" may be any data value for an element computed from corresponding data values for sub-elements of that element. In some embodiments, an aggregate data value may be computed as a sum of the data values for the sub-elements that make up that element. In some embodiments, an aggregate data value may be computed as an average of the data values for the sub-elements that make up that element. In some embodiments, an aggregate data value may be computed as a total value associated with a particular element over some period of time. For example, an aggregate transaction number data value stored in relation to a region may represent a total number of transactions conducted within that region in a given period of time.

A "computation" may be any function or algorithm performed with respect to data values associated with an element. In some embodiments, a computation may be a mathematical function which uses various data values as input.

A "computing device" may include any suitable device that can electronically process data. Examples of computing devices include desktop computers, mobile devices or mobile computing devices, television sets, etc.

An "element" or "sub-element" may include any component for which a computation may be performed. An element may be composed of multiple sub-elements. An element may belong to a category or other means for dividing some set of data. An element and its sub-elements may related to a common characteristic. For example, an example of an element may be a state and a sub-element may counties within that state. The sub-element "county" may also be a element to sub-elements of "zip codes." The common characteristic in this example may relate to geographic area. Other examples of (elements: and sub-elements) may include: (profession: doctor, lawyer, teacher); (industry: cars, consumer electronics, food); (activity: work, exercise, play)

A "hierarchy" can refer to any suitable arrangement of sub-elements as they relate to respective elements. In some embodiments, an element may be comprised of sub-elements, such that the sub-elements "belong to" the element.

A "query" may be any suitable request for information. In some embodiments, a query may include an indication of an element on which computations are to be performed. In some embodiments, the query may include an indication of a computation to be performed.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

Details of some embodiments of the present disclosure will now be described in greater detail.

FIG. 1 depicts a number of components that may be involved in a system used to implement at least some embodiments of the disclosure. In FIG. 1, a client device 102 may submit a query to a service provider computer 104. The service provider computer 104 may obtain data from a number of data providers 106 (1-N), and may perform computations 108 on various elements 110 with the obtained data as inputs to those computations 108. In some embodiments, a computation 108 may be a function or algorithm configured to determine a status of a particular element with respect to the query.

The client device may be any suitable electronic device capable of submitting a query to the service provider computer 104. For example, a client device 104 may be a personal computer or a mobile phone. In some embodiments, the client device 104 may provide an indication of a particular computation to be performed on one or more elements 110, as well as an indication of a level of granularity for the elements to be identified.

The data providers 106 may be any suitable entity from which data may be received. For example, data providers 106 may be merchants or other resource providers. In another example, a data provider 106 may be a payment processing network that maintains, and provides, data related to processed transactions. While depicted as being external to the service provider computer 104, it should be noted that, in some embodiments, at least some of the data providers 106 may be the same entity as, or operated on behalf of the same entity as, the service provider computer 104. In some embodiments, the service provider computer 104 may receive data from the data providers 106 and may aggregate and/or store that received data in a data store local to the service provider computer 104.

The data obtained from the data providers can be of any suitable nature. Examples of data that can be that can be obtained from data providers may include transaction data from credit and debit card transactions. Data elements of data obtained from such transaction data may include merchant ID, terminal ID, transaction amount, account number (or a token corresponding to the account number), transaction time, etc. Other examples of data that can be obtained from data providers can include data relating to the performance (processing speed, memory usage, downtime) of certain computational devices in a given area or network; environmental characteristics for different regions or circumstances (e.g., pollution, temperature, etc.).

The service provider computer 104 may be any suitable computing device capable of performing the functionality described herein. In some embodiments, the service provider computer 104 may include a means for identifying computations to be performed in relation to a received query. For example, the service provider computer 104 may include artificial intelligence configured to determine, based on a particular query, one or more data values relevant to the query and a function that uses the one or more data values as input which is responsive to the query.

In accordance with embodiments as described herein, the service provider computer 104 may be configured to increase the efficiency of processing the query by reducing the number of computations that need to be completed. To do so, the service provider may maintain a hierarchy of elements (having elements and sub-elements that comprise those elements) and may store aggregate data values for each element at each level of the hierarchy. The service provider computer 104 may reduce the overall number of computations that need to be performed for a query by performing the computation on high-level elements, filtering the high-level elements based on the results of the computations, and deactivating (e.g., making inactive) the elements which are sub-elements of the high-level elements having the least-relevant computation results. The technique may be repeated at each level of the hierarchy until a specified level of granularity (i.e., level of the hierarchy) is reached. Once the specified level of granularity is reached, the computations need only be performed on the active elements of that level. These techniques are described in greater detail below.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
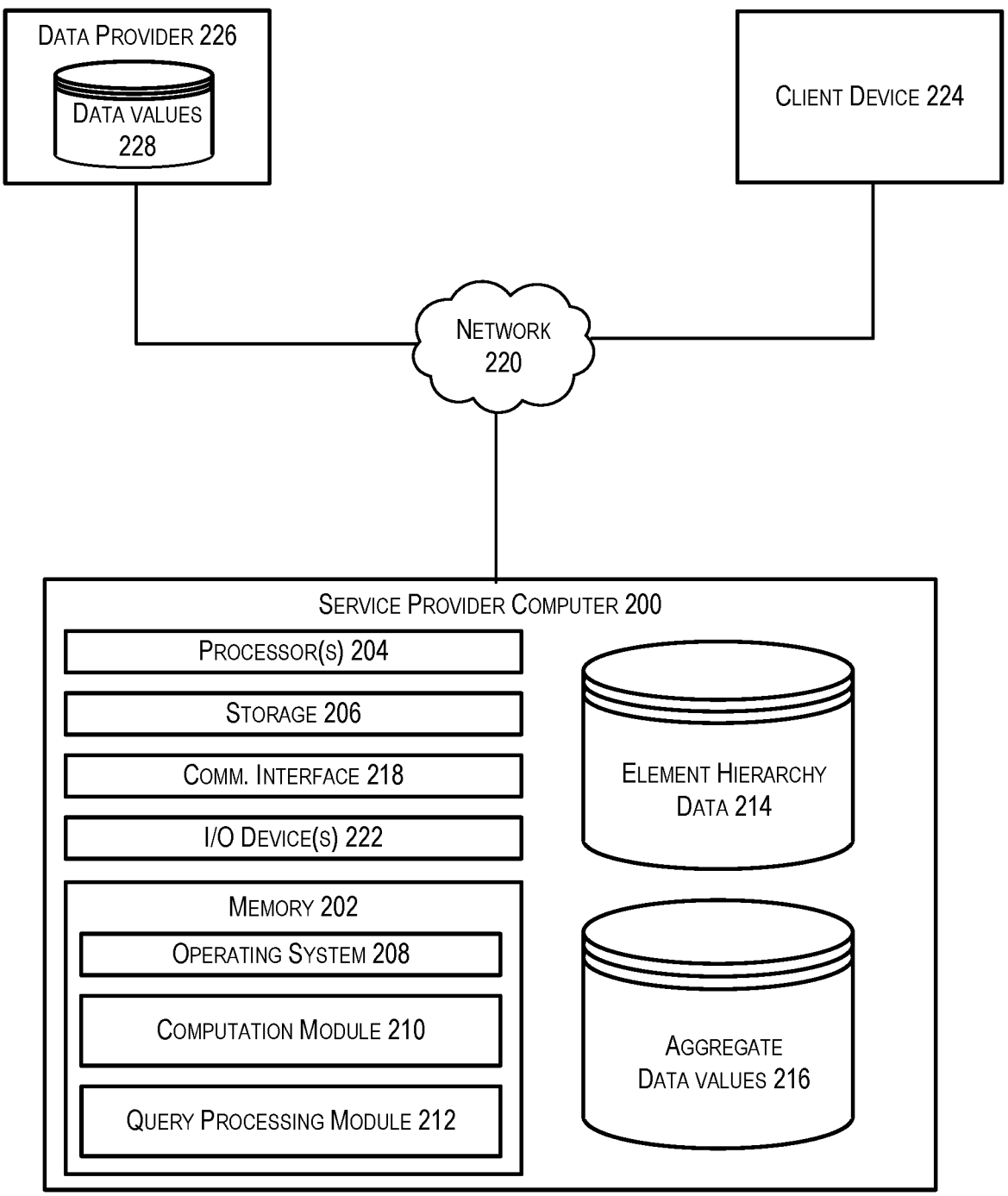
FIG. 2 depicts a diagram of an exemplary service provider computer that may be configured to process queries in accordance with the disclosed techniques.

FIG. 2 depicts a diagram of an exemplary service provider computer 200 that may be configured to process queries in accordance with the disclosed techniques. The service provider computer 200 may be an example of the service provider computer 104 described with respect to FIG. 1 above.

The service provider computer 200 may be any type of computing device capable of performing queries while reducing the number of computations needed to complete those queries in accordance with embodiments described herein. In at least some embodiments, the service provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer 200, the memory 202 may be volatile (such as random access memory (RAM)) and/or non-volatile (such as read-only memory (ROM), flash memory, etc.). The service provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for performing computations on provided input data (computation module 210) and a module for processing a received query (query processing module 212). The memory 202 may also include a number of data stores, including element hierarchy data 214, which maintains information associated with relationships between various elements, and aggregate data values 216, which may maintain data values that have been aggregated for an element based on its sub-elements.

In some embodiments, the computation module 210 may, in conjunction with the processor 204, be configured to identify and perform an appropriate computation using provided input values. In some embodiments, a computation to be performed on an element may be a function or algorithm requiring particular data values associated with that element as input. The output of a computation may be in any suitable format. In some embodiments, a function or algorithm to be performed in a computation may be provided with or in a submitted query. In some embodiments, the content of a query may be translated into an appropriate computation (e.g., using an artificial intelligence algorithm). In some embodiments, the computation module 210 may receive an indication of a computation to be performed and an element upon which it is to be performed. The computation module 210 may then retrieve one or more input data values (which may be aggregated data values) and execute the computation using those input data values. The computation module 210 may then return a result value for that element.

In some embodiments, the query processing module 212 may, in conjunction with the processor 204, be configured to process queries in accordance with the techniques described herein. Accordingly, the query processing module 212 may identify a type of element relevant to the query based on a determined level of granularity of the query. The query processing module 212 may then identify a number of high-level elements which include that type of element as a sub-element. In some embodiments, the query processing module 212 may identify a number of high-level elements which are multiple levels higher on a hierarchy than the identified type of element relevant to the query. The query processing module 212 may then execute the computation module 210 with respect to each of the identified number of high-level elements to obtain result values for those high-level elements. Once obtained, the query processing module 212 may sort the high-level elements based on the received result values (and their relevance to the query) and select some number of top high-level elements based on their respective results. The query processing module 212 may then recursively perform this process on the sub-elements of the selected number of top high-level elements until a particular level of granularity is reached. In this way, the query processing module 212 may select a very limited set of elements of the determined type of element relevant to the query on which to perform computations, significantly reducing the total number of computations that need to be completed. This will be described in greater detail below.

The data stored in databases 214 and 216 may be dynamic, static, or some combination of dynamic and static data. In some embodiments, hierarchy data 214 may include any information about element relationships. For example, hierarchy data 214 may include information on which elements are sub-elements of another element. In some embodiments, aggregate data values 216 may include data values for each element which have been aggregated from corresponding data values of the sub-elements of that element.

The service provider computer 200 may also contain communications interface(s) 218 that enable the service provider computer 200 to communicate with a stored database, another computing device or server, one or more remote devices, and/or any other suitable electronic devices. In some embodiments, the communication interface 218 may enable the service provider computer 200 to communicate with other electronic devices on a network 220 (e.g., on a private network). The service provider computer 200 may also include input/output (I/O) device(s) and/or ports 222, such as for enabling connection with a keyboard, a mouse, a pen, a voice input device, a touch input device, a display, speakers, a printer, etc.

In some embodiments, the network 220 may include any one or a combination of many different types of networks, such as cable networks, the Internet, wireless networks, cellular networks, and other private and/or public networks. While the illustrated example depicts various electronic devices accessing the service provider computer 200 over the network 220, the described techniques may equally apply in instances where the electronic devices interact with the service provider computer 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The service provider computer 200 may be in communication with a number of other electronic devices. For example, the service provider computer 200 may be in communication with a client device 224 and/or data providers 226. Each of the client device 224 and data providers 226 may be capable of interacting with the service provider computer 200 as described herein.

The client device 224 may be any electronic device configured to enable a query to be submitted to the service provider computer 200. In some embodiments, the client device 224 may establish communication with the service provider computer 200 by accessing a website hosted on behalf of the service provider computer 200 (e.g., via a browser application). In some embodiments, the client device 224 may have installed upon it a software application which is supported by the service provider computer 200 and which enables interaction between a user of the client device 224 and the service provider computer 200.

The data provider 226 may any source from which the service provider computer 200 may obtain data values 228. In some embodiments, a data provider 226 may push data values 228 to the service provider computer 200. In some embodiments, the service provider computer 200 may request (e.g., pull) data values 228 from the data provider. Data may be obtained by the service provider computer 200 from the data provider 226 in real time or periodically. For example, the service provider computer 200 may be provided updated data values 228 each time the data values 228 are updated. In another example, the service provider computer 200 may be provided updated data values 228 every hour.

Figure 3:
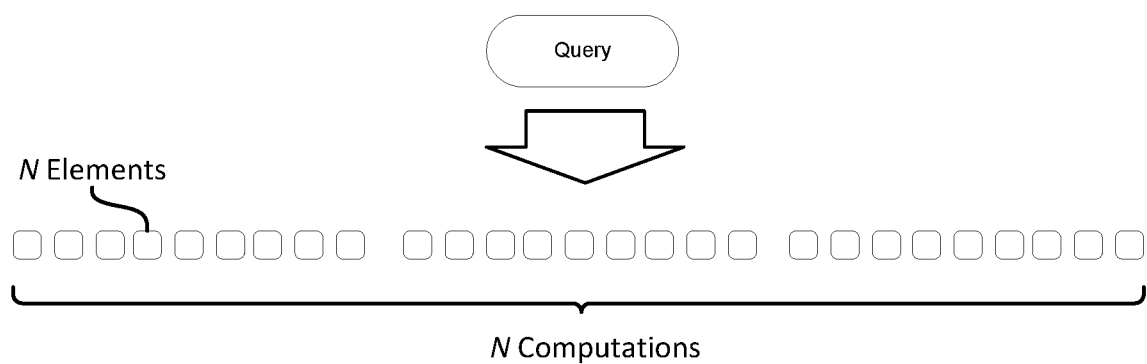
FIG. 3 depicts an illustration of computations to be performed by a conventional system in accordance with a received query.

FIG. 3 depicts an illustration of computations to be performed by a conventional system in accordance with a received query. In a conventional system, a query may be determined to pertain to a type of element based on a determined level of granularity for that query. Since a typical system would compute results for each of the identified elements, the number of computations to be performed in response to such a query would then be equal to the number of elements identified. While this can be done without significant hardship for queries that involve a small number of elements and/or relatively simple computations, such a system would not scale well with large data sets that involve a significant number of elements or complex computations (such as those that involve the use of artificial intelligence). Even systems that perform computations in mere fractions of a second may take several minutes to provide a result set for a query, which is unacceptable in today's fast-paced environment. Accordingly, such conventional systems are less than ideal when used on large data sets and/or with complex computations.

Figure 4:
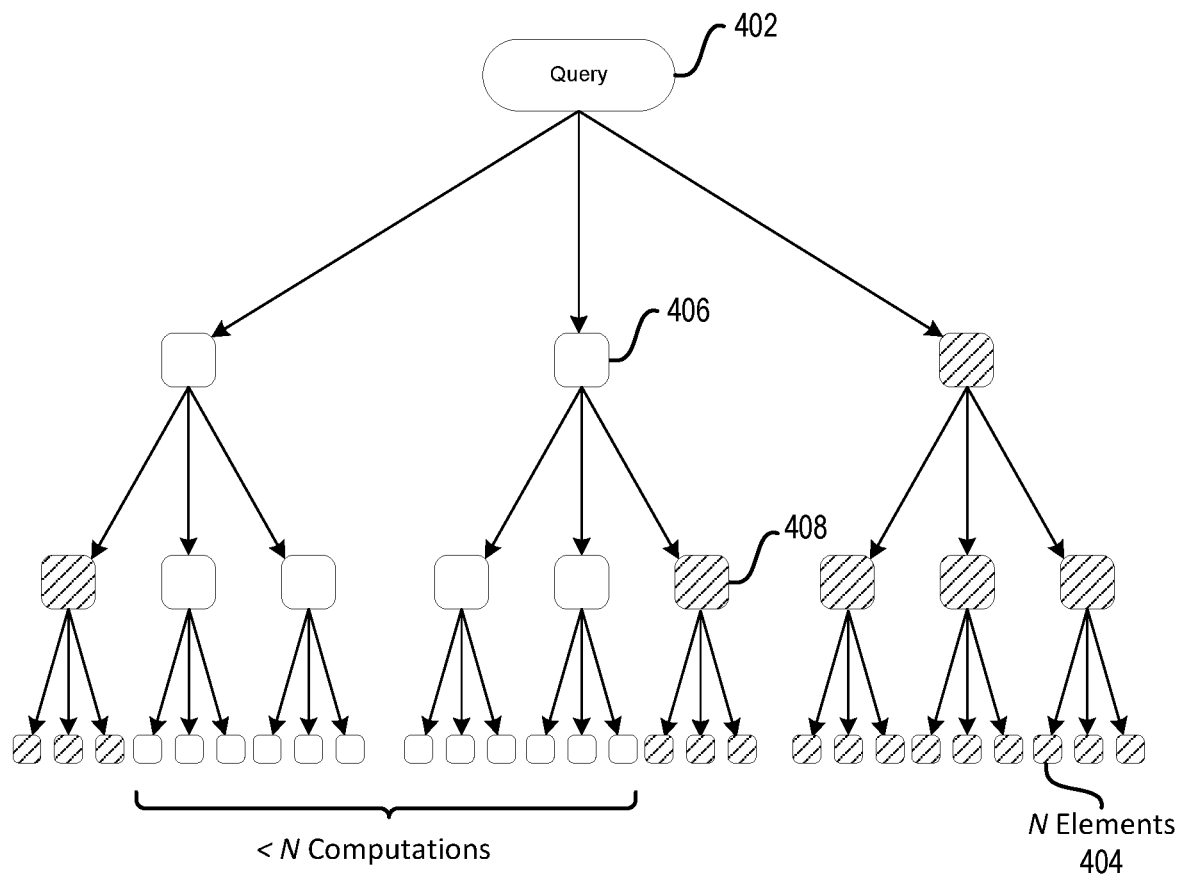
FIG. 4 depicts an illustrative example of techniques for reducing the number of computations to be performed in a query in accordance with embodiments of the disclosure.

FIG. 4 depicts an illustrative example of techniques for reducing the number of computations to be performed in a query in accordance with embodiments of the disclosure. In FIG. 4, a query 402 may be submitted to a service provider as described herein.

Upon receiving the query 402, a service provider may determine one or more computations appropriate to be performed in order to respond to the query 402. Additionally, the service provider may identify a type of element 404 which is relevant to the query. Assume, for the purposes of this example, that there is some number N of element 404.

In accordance with techniques described herein, the service provider may begin processing the query by identifying a number of high-level elements 406 which include, as sub-elements, the elements 404. In some embodiments, the elements 404 may be included within a hierarchy that includes multiple levels. For example, the high-level elements 406 may be composed of elements 408, which may in turn be composed of elements 404. In some embodiments, aggregate data values may be stored with respect to each element (404, 406, 408, etc.) of a hierarchy. For example, a high-level element 406 may have associated with it data values determined by aggregating corresponding data values for each of the elements 408 from which that high-level element 406 is composed. Similarly, each of the elements 408 from which that high-level element 406 is composed may have associated with it data values determined by aggregating corresponding data values for each of the elements 404 from which that element 408 is composed.

When processing the query 402, the service provider may initially perform the identified computations on the high-level elements 406. To do this, the service provider may retrieve a number of aggregate data values stored in relation to each of the high-level elements 406 and may use those aggregate data values as inputs to the computation. Once computations have been performed on each of the high-level elements 406, the service provider may sort those high-level elements 406 based on the results of their respective computations. For example, in some embodiments, the high-level elements 406 may be sorted in ascending or descending order according to their respective computation results. Once sorted, the service provider may then select some threshold number of top results. In some embodiments, this threshold number may be a number. For example, the top 10 high-level elements 406 may be selected. In some embodiments, the threshold number may be some portion or percentage. For example, the top 50% of the high-level elements 406 may be selected. The service provider may then deactivate (e.g., make inactive) each of the high-level elements 406 which were note selected as well as each of the sub-elements of the unselected high-level elements 406.

Once the high-level elements 406 have been processed in the manner described above, the process may be recursively repeated for each of the sub-elements of the high-level elements 406. In other words, the techniques may be repeated on the elements 408 from which the selected high-level elements 406 are composed. These techniques may be recursively repeated until a particular level of granularity is reached. In other words, the process may be repeated to deactivate a number of elements 404 until the process reaches a hierarchy level associated with those elements. Once the process has reached such a level, computations may be performed on only the elements 404 which are currently active. Hence, instead of performing the identified computations on all N elements 404 (as would be done in conventional systems), the service provider would only perform the computations on the elements of the N elements 404 which are active, significantly reducing the number of computations performed.

Figure 5:
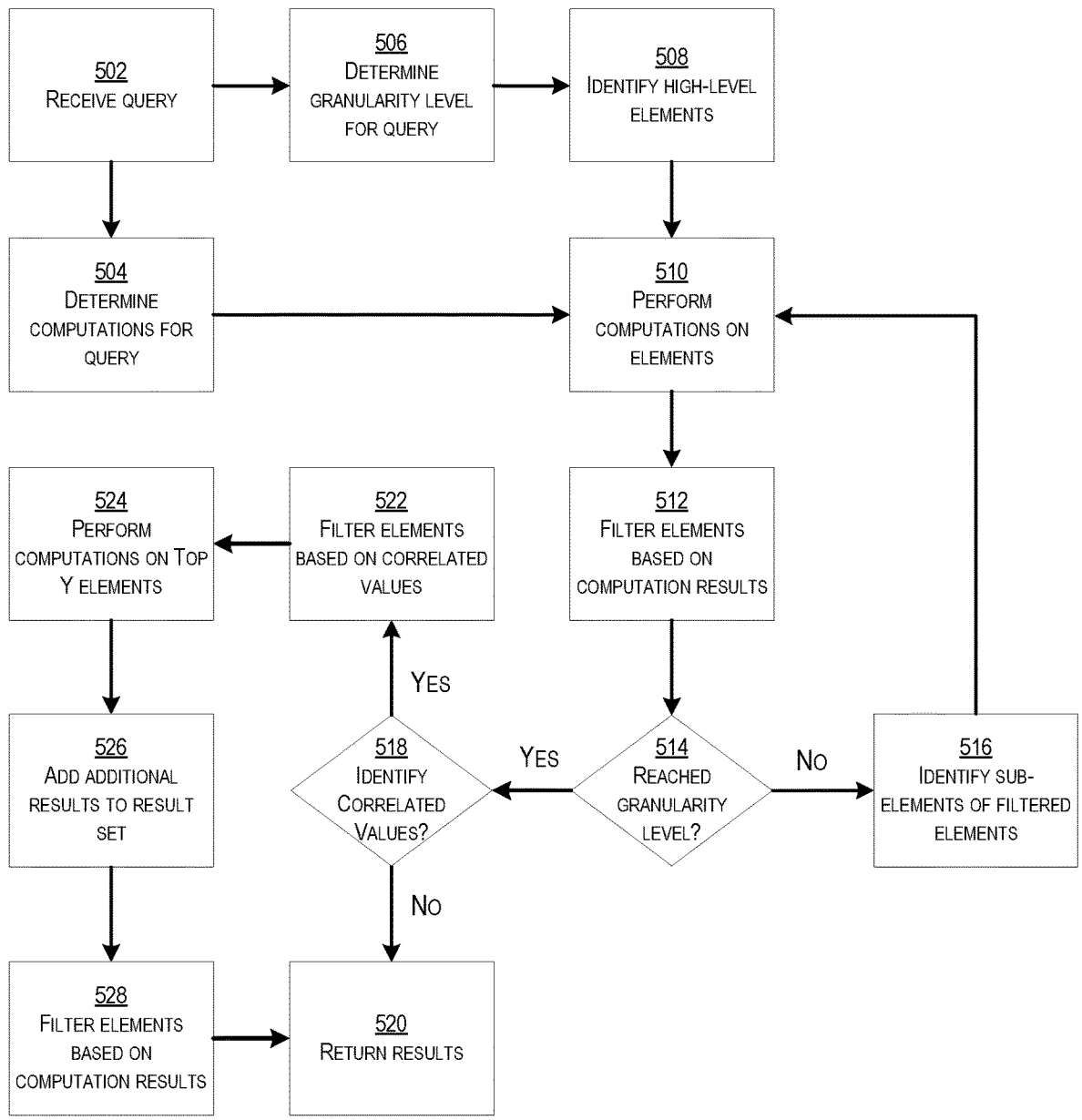
FIG. 5 depicts a flow chart illustrating a process for generating a result set for a query in accordance with embodiments herein.

FIG. 5 depicts a flow chart illustrating a process for generating a result set for a query in accordance with embodiments herein. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). The process 500 may be performed by a service provider, such as the service provider 200 depicted in FIG. 2.

The process 500 may begin at 502, when a query is received. In some embodiments, a query may be received via a network connection. For example, a user may submit a query to the service provider via a website maintained by that service provider. In some embodiments, a user may submit a query to the service provider via a software application. For example, the user may operate a mobile device (such as a smart phone). In this example, the mobile device may have installed upon it a mobile application that causes the mobile device to establish a communication session with the service provider. A query may be submitted to the service provider via that communication session.

At 504, the process 500 may involve determining computations to be performed in relation to the query. In some embodiments, the submitter of the query may provide an indication of what computation should be used in generating a result set. The query may also indicate a manner in which an optimal result may be detected. For example, the query may indicate that some minimum or maximum result value is optimal. In some embodiments, the computations for a query may not be readily apparent. In at least some of these embodiments, artificial intelligence (AI) may be used to determine an appropriate computation to be performed for a query.

At 506, the process 500 may involve determining a granularity level for the query. A level of granularity may be represented by a particular type of element within a hierarchy of elements on which computations are to be performed in response to the query. In some embodiments, the level of granularity may be indicated in the query. In some embodiments, the level of granularity may be determined based on one or more attributes of the query.

At 508, the process 500 may involve identifying high-level elements with which to begin processing the query. In some embodiments, the service provider may identify the highest level of elements within the hierarchy of elements that are composed of the particular type of element on which computations are to be performed. In some embodiments, high-level elements may be restrained based on information included in a query. For example, the query may be limited to a particular region, product category, or other suitable bounded set of data.

At 510, the process 500 may involve performing the determined computations on the identified elements. To do this, the service provider may retrieve data values stored in relation to the element for which the computation is to be performed. In some embodiments, this data value may be calculated based on information obtained about the element. In some embodiments, the data value may be obtained by aggregating corresponding data values for each of the sub-elements from which the element is composed. For example, a data value for a particular element may be populated with an mean average value calculated from corresponding data values for each of the sub-elements that make up that element.

At 512, the process 500 may involve filtering the elements based on the result set produced by performing the computations for each of the elements. In this step, each element may be sorted according to its respective computation result. Once sorted, some number of the elements may be selected for further processing based on their respective computation results. For example, the elements may first be sorted in descending order of their respective computation results. The top 10 results may then be selected for further processing (or as a final result set). It should be noted that by selecting some number of top results in this manner effectively deactivates each of the elements which are not selected, as well as all of the sub-elements of those unselected elements.

At 514, the process 500 may determine if the appropriate granularity level determined at step 506 has been reached. In other words, the service provider may determine if the last set of computations performed were performed on the type of element determined at step 506. If the determined level of granularity has not been reached, then the process may recursively repeat by proceeding to step 516. If the determined level of granularity has been reached, then the process may proceed to step 518.

At 516, the process 500 may involve identifying sub-elements of the elements selected during the filtering step 512. This may involve identifying the elements from which each of the elements selected during the filtering step 512 are composed. Once those elements have been identified, the process may return to 510 and the service provider may perform computations with respect to each of the identified elements.

In some embodiments, the process may be ended after 516 by returning the current result set in response to the query at 520. In some embodiments, the process 500 may involve performing an optional correction technique at 518, intended to improve the accuracy of the techniques described herein. At steps 510 and 512, the service provider may identify correlations between each of the data values used as inputs and the corresponding computation results. For example, the service provider may calculate a correlation value (e.g., an $R^2$ value) for each data value used as input. At 518, the service provider may determine what data values are most highly correlated with optimal result outcomes.

At 522, the process 500 may involve identifying a number of elements (at the determined level of granularity) on which computations have not been previously performed. The service provider may then retrieve data values for each of those identified elements which correspond to the data values determined to be most highly correlated with optimal result outcomes at step 518. The service provider may then sort each of the elements on which computations have not been previously performed.

Once sorted, the service provider may select some number of elements from the sorted elements to perform computations on at 524. The number may be some predetermined number or portion of the sorted elements. This step may involve performing the same computations as were performed on the other elements.

At 526, the process 500 may involve appending the elements selected at step 524 to the set of elements selected at step 512. At 528, the process 500 may involve filtering the elements in the result set once more based on their respective computation results. In some embodiments, this may involve sorting all of the elements in the result set by their respective computation results and selecting some predetermined number of results to present. In some embodiments, the result set presented in response to the query may be sorted based on computation results. In some embodiments, the set of results provided in response to the query may include additional information about the elements in the result set. For example, computation results may be provided with respect to each of the elements included in the result set.

By way of illustrating the example process described above, consider a scenario in which the service provider database that holds transaction and tourist data within the United States, receives a query such as "What is the best zip code in the United States to build a hotel?" In a simplified example of processing this query, one would limit the query to the United States and limit merchant information to hotels. Using those constraints, one could perform a computation that is a function that uses inputs of revenue, business costs, and tourist numbers in a particular zip code to find a zip code where average profit per tourist is highest (note that a typical computation may use as input a number of additional factors).

A conventional system may respond to the query described above by performing the computation for each separate zip code in the US and then sorting and presenting the results. However, with approximately 42,000 zip codes in the US, a computation taking just 40 milliseconds would result in such a system taking about 5.6 to return an unsorted result set. This time would be drastically increased with the use of a more complex computation.

A system which uses the techniques described herein may return a result set in significantly less time. To do this, such a system may first identify high-level elements on which to perform the computation. In the given scenario, the system may first identify as high-level elements, and perform the computations for, each state in the US. The system may also determine that the level of granularity for the query is the zip code level of a hierarchy of elements. This example hierarchy may include states, counties, and zip codes. The service provider may store aggregate data values for each element (state, county, zip code) at each level of the hierarchy.

In this example, the query may again be "What is the best zip code in the United States to build a hotel?." In this example, the best zip code may be an example of a sub-element. Examples of elements to those sub-elements may include county and state. To respond to the query, the service provider may identify aggregate data values stored with respect to each state in the US. Some data values may be aggregated as a sum total. For example, tourist numbers for the state and for a particular period of time may be aggregated as a sum of the tourist numbers for each zip code in that state. "Tourists" may be identified as consumers that conduct transactions in a region which are not domiciled in that region, such that a payment processing network may identify transactions in a transaction database that have originated from tourists. Some data values may be aggregated as an average. For example, hotel profits for a state may represent an average profit per hotel across each of the zip codes in that state. Information on hotel profits may be ascertained by a payment processing network by assessing fees paid to the hotel as offset by expenses paid by that hotel. In another example, the database at the service provider may hold a set of zip codes and may aggregate data under each of the zip codes. For example, aggregate data values under a zip code might include the number of tourists or the number of sales in the zip code for a given time period (e.g., from Jan. 1, 2018 to Jan. 1, 2019).

Once the service provider has performed the computations on the states, a first result set may be generated which includes those computations. The set of states may then be sorted by average profit per tourist (e.g., according to the first result set). The average profit per tourist per state may be an example of an aggregate data value for an element such as a state. The service provider may then reduce the set of states to some predetermined number. The predetermined number of states may be a subset of the set of elements which may be the fifty states in the United States. For the purposes of this example, the service provider may select the top 5 states from the set of states based on average profit per tourist. The service provider may then repeat the process described herein by identifying elements which are sub-elements of the selected 5 states. In this example, the service provider may identify each of the counties within those 5 states and perform the computations on those counties using aggregate data values for those counties to generate a second result set.

For this example, assume that each state is composed of an average of 60 counties. Once the service provider has performed the computations on the counties, a set of those counties may be sorted by average profit per tourist (e.g., according to the second result set). The service provider may then reduce the set of counties to some predetermined number. For the purposes of this example, the service provider may select the top 5 counties (across states) from the set of counties based on average profit per tourist. The service provider may then repeat the process described herein by identifying elements which are sub-elements of the selected 5 counties. In this example, the service provider may identify each of the zip codes within those 5 counties and perform the computations on those zip codes using aggregate data values for those zip codes. In this example, the 5 counties may be sub-elements to an element such as a particular state. The set of average profit per tourist for the 5 counties may be an example of a second result set.

For this example, assume that each county is composed of an average of 14 zip codes. In this example, a zip code would be a sub-element of both the country and state in which the zip code is present. Once the service provider has performed the computations on the zip codes, a set of those zip codes may be sorted by average profit per tourist (e.g., according to the third result set). In some embodiments, this set of zip codes (or some predetermined number of the optimal zip codes) may be returned as the result set (e.g., a subset of the third result set) in response to the query, ending the process. The result set from the set of zip codes (which may include just one or more zip codes) may be an example of a third result set. Note that the user of "first," "second," etc. in the claims in this description is not intended to limit embodiments to any particular number, or direct sequential sequence. For example, a third result set could be formed before first and second result sets in embodiments, and there can be as many intervening result sets as desired.

In some embodiments, the accuracy of the system may be increased by identifying, while performing computations on various elements in the earlier stages, correlations between data values used as input and the resulting computation result. The service provider may then identify zip codes on which the computations were previously not performed and which are associated with optimal data values determined to be highly correlated to the computation results. The service provider may then perform computations on some predetermined number of those zip codes. For example, the service provider may identify 100 zip codes associated with data values most highly correlated to optimal computation results. Those zip codes may also be added to the set of zip codes identified above and the set may be sorted once more in accordance with the results of the computations for those zip codes.

In the example above, the service provider would perform 50 computations at the state level, 300 computations at the county level (5 states×60 counties in each state), and 70 computations at the zip code level (5 counties×14 zip codes in each county), for a total of 420 computations. At 40 milliseconds per computation, the service provider is able to provide a result set in accordance with the example query in 3.4 seconds.

Figure 6:
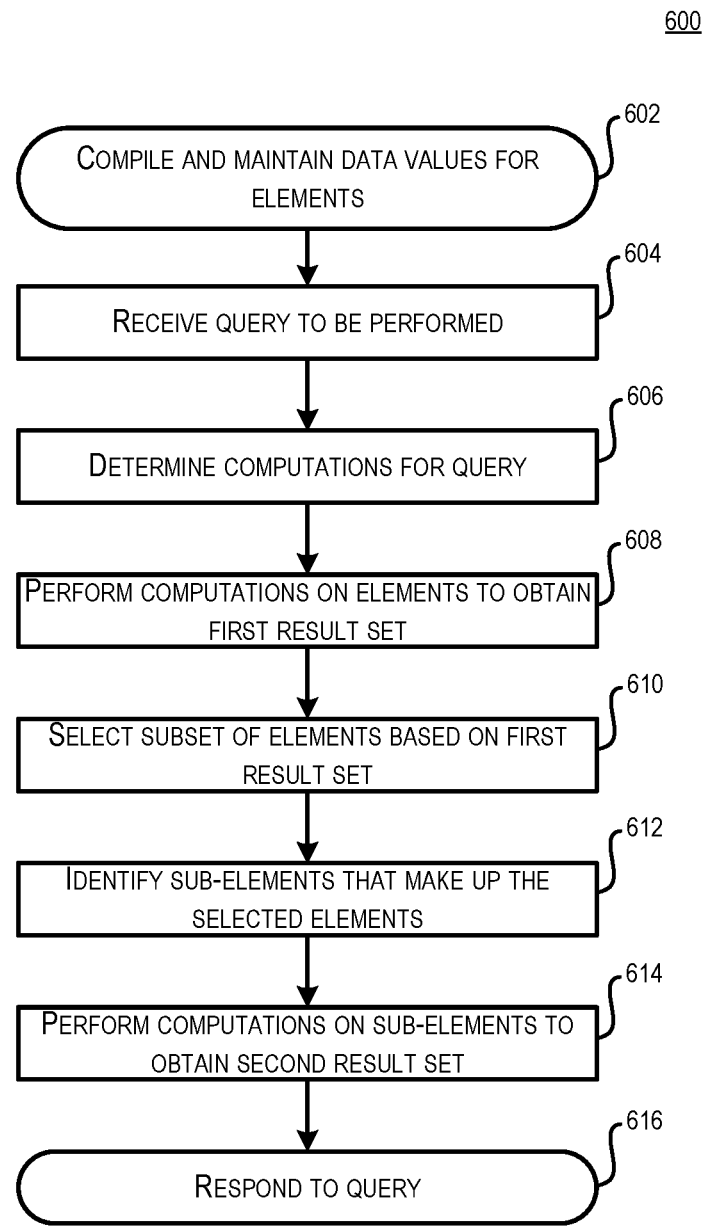
FIG. 6 depicts a flow diagram illustrating an example process for generating a result set in accordance with embodiments of the disclosure.

FIG. 6 depicts a flow diagram illustrating an example process for generating a result set in accordance with embodiments of the disclosure. The process 600 may be performed by a service provider, such as the service provider 200 described with respect to FIG. 2 above.

Process 600 may begin at 602, wat which time the service provider may compute and store data values for a number of elements. In some embodiments, data values may be updated dynamically as new data is received with respect to a particular element. In some embodiments, a set of elements and sub-elements may be stored with respect to a hierarchy. In other words, the service provider may store each element with an indication as to what other elements (i.e., sub-elements) make up that element as well as what other elements are made up of the stored element. Aggregate data values for each of the elements may be data values computed from corresponding data values for sub-elements that make up that element. For example, an aggregate data value stored with respect to the elements may be a data value computed as a sum of the corresponding data values for the sub-elements that make up that element. In another example, an aggregate data value stored with respect to the elements may be a data value computed as an average of the corresponding data values for the sub-elements that make up that element.

At 604, the process 600 may involve receiving a query to be performed with respect to various elements. In some embodiments, the query is submitted via a software application for which the service provider performs a backend call.

At 606, the process 600 may involve determining computations to be performed with respect to the query. In some embodiments, the computations may include at least one mathematical function which uses the aggregate data values as input. Examples of mathematical functions may include addition, subtraction, multiplication, division, or any combination of the foregoing (e.g., an average).

At 608, the process 600 may involve performing the computations on elements to obtain a first result set. This may involve performing the computation using aggregate data values stored in relation to each element and appending the respective results of each computation to the first result set.

At 610, the process 600 may involve selecting a subset of the elements based on the first result set. In some embodiments, the subset of the set of elements may be selected by sorting the first result set and selecting a number of optimal results from the sorted first result set. In some embodiments, the number may be a predetermined threshold number. In other embodiments, the number may be a predetermined portion of the first result set.

At 612, the process 600 may involve identifying each of the sub-elements that make up the selected subset of the elements. In some embodiments, the elements may be categories and the sub-elements may be sub-categories that each fall within those categories. In some embodiments, the elements may represent geographic regions, and the sub-elements may represent geographic sub-regions that make up the geographic regions.

At 614, the process 600 may involve performing the computations on the identified sub-elements to obtain a second result set. This may involve performing the computation using aggregate data values stored in relation to each sub-element and appending the respective results of each computation to the second result set.

In some embodiments, the above may be recursively repeated until a particular level of granularity is achieved. For example, the service provider may obtain a third result set by selecting a subset of the set of sub-elements based on the second result set in accordance with the query, and performing the computations on data values for a number of sub-elements that make up the sub-elements in the subset of the set of sub-elements.

At 616, the process 600 may involve responding to the query with at least a portion of the second result set. In some embodiments, the second result set may be returned in its entirety in response to the query. In some embodiments, the second results set may be sorted and only some portion of the results may be returned in response to the query.

Embodiments of the disclosure provide for a number of advantages over conventional systems. For example, as described herein, data is structured and processed in a manner that is significantly more efficient than data is able to be processed in conventional systems. It should be noted that embodiments of the system described herein may trade off some level of accuracy for that efficiency. However, while a loss of accuracy may be expected, the described system is much better suited to handle large-scale data processing in situations which require a prompt response to a query.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    maintaining, by a service provider, a hierarchy of a set of elements and sub-elements, wherein each element and sub-element comprises an aggregate data value, each element being associated with multiple sub-elements and wherein the aggregate data value of the element is computed based on aggregate data values of the multiple sub-elements of the hierarchy that are associated with the element;
    receiving a query indicating computations to be performed on one or more sub-elements;
    obtaining a first result set by performing the computations on aggregate data values for each of the elements included in a first level of the hierarchy;
    selecting a subset of the set of elements in the first level by sorting the first result set in accordance with the query and selecting a number of optimal results from the sorted first result set;
    obtaining a second result set by performing the computations on aggregate data values for a portion of sub-elements included in a second level of the hierarchy, the portion of sub-elements corresponding to sub-elements that are associated to the subset of the set of elements selected from the first level of the hierarchy; and
    performing further processing with respect to at least a portion of the second result set.

2. The method of claim 1, wherein the computations comprise at least one mathematical function which uses the aggregate data values as input, and wherein performing further processing comprises responding with at least the portion of the second result set.

3. The method of claim 1, wherein the number is a predetermined threshold number.

4. The method of claim 1, wherein the number is a predetermined portion of the first result set.

5. The method of claim 1, wherein the set of elements and sub-elements are stored in a database with respect to the hierarchy, and wherein performing further processing comprises obtaining a third result set by performing the computations on aggregate data values for each of the sub-elements comprising the elements in the subset; and
    providing at least a portion of the third result set.

6. The method of claim 1, wherein aggregate data values for each of the elements comprise data value computed from corresponding data values for sub-elements that make up that element.

7. The method of claim 6, wherein at least one aggregate data value for the elements comprises a data value computed as a sum of the corresponding data values for the sub-elements that make up that element.

8. The method of claim 6, wherein at least one aggregate data value for the elements comprises a data value computed as an average of the corresponding data values for the sub-elements that make up that element.

9. A service provider comprising:
    a processor, and
    a memory including instructions that, when executed with the processor, cause the service provider to, at least:
        maintain a hierarchy of a set of elements and sub-elements, wherein each element and sub-element comprises an aggregate data value, each element being associated with multiple sub-elements and wherein the aggregate data value of the element is computed based on aggregate data values of the multiple sub-elements of the hierarchy that are associated with the element;
        receive a query indicating computations to be performed on one or more sub-elements;
        obtain a first result set by performing the computations on aggregate data values for each of the elements included in a first level of the hierarchy;
        select a subset of the set of elements in the first level by sorting the first result set in accordance with the query and selecting a number of optimal results from the sorted first result set;
        obtain a second result set by performing the computations on aggregate data values for a portion of sub-elements included in a second level of the hierarchy, the portion of sub-elements corresponding to sub-elements that are associated to the subset of the set of elements selected from the first level of the hierarchy; and
        perform further processing with respect to at least a portion of the second result set.

10. The service provider of claim 9, wherein the subset comprises a predetermined number of elements from the set of elements.

11. The service provider of claim 9, wherein performing the computations on elements to obtain the first result set comprises performing a computation using aggregate data value of each element and appending a corresponding result of the computation to the result set.

12. The service provider of claim 9, wherein the elements comprise categories and the sub-elements comprise sub-categories that each fall within those categories.

13. The service provider of claim 9, wherein the elements represent geographic regions, and the sub-elements represent geographic sub regions that make up the geographic regions.

14. The service provider of claim 9, wherein the query is submitted via a software application for which the service provider performs a backend call.

15. The service provider of claim 9, wherein the instructions further cause the service provider to obtain a third result set by:
    selecting a subset of the set of sub-elements based on the second result set in accordance with the query; and
    performing the computations on data values for a number of sub-elements that make up the sub-elements in the subset of the set of sub-elements.

16. The service provider of claim 9, wherein the instructions further cause the service provider to:
    sort the second result set; and
    select the portion of the result set as some number of most optimal results in the sorted second result set.

17. A client device comprising:
    a processor; and
    a memory including instructions that, when executed with the processor, cause the client device to, at least:
        receive, from a user of the client device, a query requesting a result set;
        determine, based on the query, one or more sub-elements associated with the query;
        provide, to a service provider, the query including an indication of the one or more sub-elements, the service provider being caused to:
            obtain a first result set by performing one or more computations on aggregate data values stored in relation to a number of elements included in a first level of a hierarchy, which are composed of the one or more sub-elements, the number of elements being maintained in the hierarchy wherein aggregate data value of an element is computed based on aggregate data values of sub-elements of the hierarchy that are associated with the element;
            select a subset of the number of elements in the first level by sorting the first result set in accordance with the query and selecting a number of optimal results from a sorted first result set;
            obtain a second result set by performing the computations on the aggregate data values for a portion of sub-elements included in a second level of the hierarchy, the portion of sub-elements corresponding to sub-elements that are associated to the subset of the number of elements selected from the first level of the hierarchy;
        receive, from the service provider, a response to the query that includes at least a portion of the second result set; and
        perform additional processing with respect to the portion of the second result set.

* * * * *